2,822,816
Patented Feb. 11, 1958

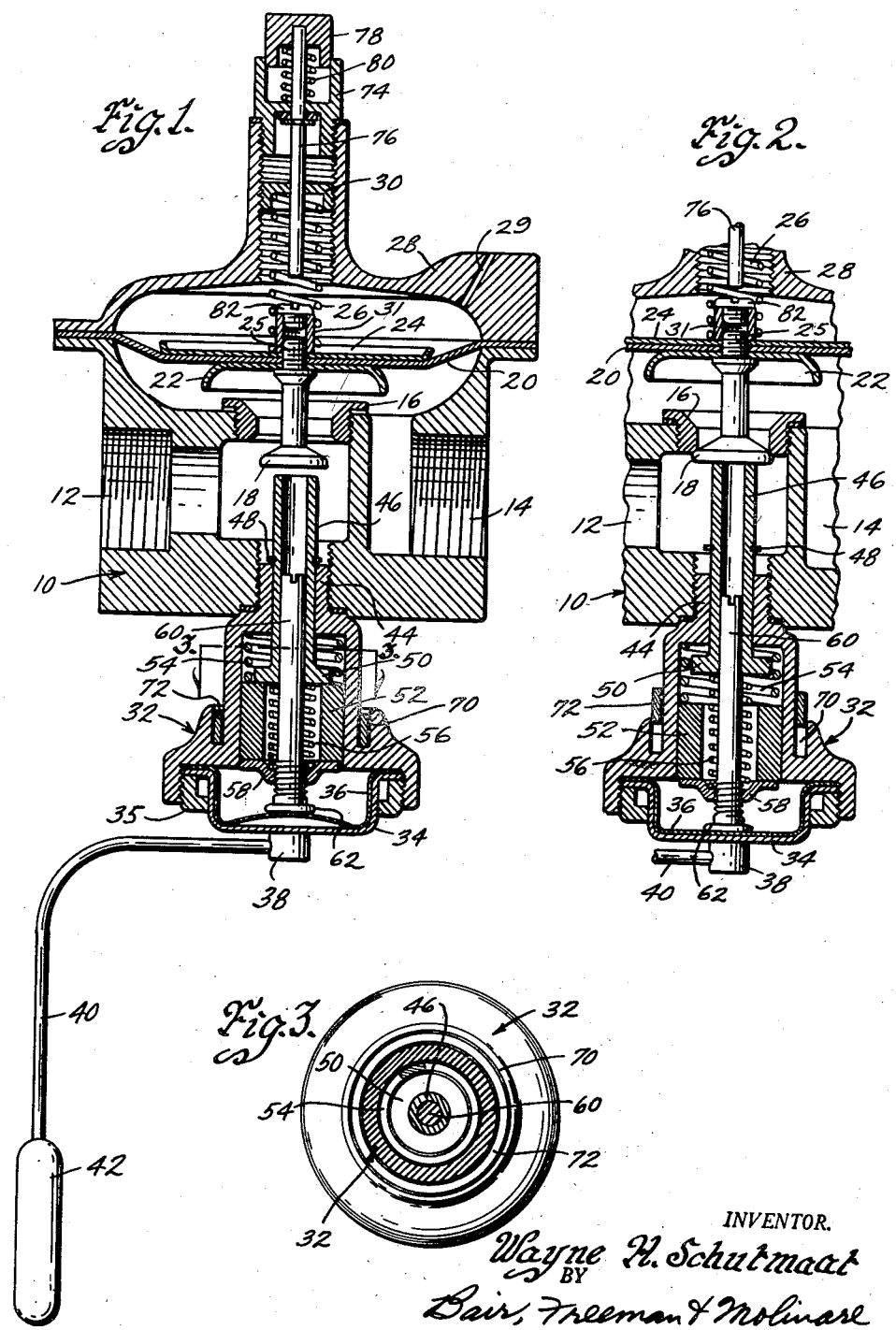
INVENTOR.
Wayne H. Schutmaat
BY
Bair, Freeman & Molinare
ATTYS.

2,822,816

AUTOMATIC SHUT-OFF

Wayne H. Schutmaat, Elkhart, Ind., assignor to Penn Controls, Inc., Goshen, Ind., a corporation of Indiana Application January 22, 1954, Serial No. 405,645

8 Claims. (Cl. 137—80)

This invention relates to an automatic safety shut-off which may be mounted on pressure regulators or other types of valves and which is operable upon a predetermined condition occurring such as loss of temperature or pressure to move the regulator or other valve to shut-off position requiring manual reset before the valve can be put back into automatic operation.

One object of the invention is to provide a comparatively simple and inexpensive safety shut-off unit adapted to be connected to the body of a regulator or other type of valve or other control device, said unit being self contained and having means to coact with the valve in the valve body and move it to the off position upon the occurrence of a pre-determined condition, the shut-off unit then keeping the valve in that position until the device is reset whereupon it is again ready for an automatic shut-off operation when the predetermined condition reoccurs.

Another object is to provide a shut-off unit in the form of a body having therein a shut-off element projectable from the body to engage a valve plug or the like and seat it, a spring within the body being operable to perform this function, and means being provided to lock the spring against operation, such means being specifically an armature and a magnet which are normally engaged with each other.

A further object is to provide means for relatively disengaging the magnet and armature so that the spring can act in its intended capacity to close the valve or perform whatever function it is designed for, manually operable reset means being provided to open the valve again and at the same time reengage the magnet and armature so that they are reset for a subsequent safety operation.

Still a further object is to provide a simple means to indicate the operation of the shut-off unit, this means being provided in the form of a groove around the body of the unit in which there is a ferrous ring and the groove being positioned to receive this ring only when the armature is against the magnet and to permit the change in magnetic flux when the armature is spaced from the magnet to raise the ring against the action of gravity and retain it in an elevated position where it is observable for indicating purposes.

With these and other objects in view, my invention consists in the construction, arrangement and combination of the various parts of my automatic shut-off whereby the objects contemplated are obtained as hereinafter more fully set forth, pointed out in my claims and illustrated in the accompanying drawings wherein:

Figure 1 is a cross-sectional view of a regulator valve to which my automatic shut-off has been applied, the parts being shown in the normal operating position with the regulator valve open and regulating the flow of gas or the like therethrough.

Figure 2 is a similar sectional view of a portion of Figure 1 showing the automatic shut-off in the tripped position and Figure 3 is a horizontal detail sectional view on the line 3—3 of Figure 1.

On the accompanying drawings I have used the reference numeral 10 to indicate a valve body such as one for a pressure regulator or any other type of valve. The valve body illustrated has an inlet 12 and an outlet 14 between which are located a seat 16. A valve plug 18 is adapted to cooperate with the seat 16 in the regulation of the flow of gas or the like through the valve body 10 and is under control of a diaphragm 20 which is responsive to the outlet pressure within the valve body.

The diaphragm 20 has its peripheral edge sealed with relation to the body 10 by the usual diaphragm cover 28 in which is a spring 26 that may be adjusted by means of the threaded element 30 therein for regulating the pressure at which the regulating valve operates.

A closure plug 74 is threaded into the cover 28 to enclose the adjusting element 30 and the cover 28 is vented to atmosphere at 29. Discs 22 and 24 are provided on opposite sides of the diaphragm 20 and are retained in position by a tubular nut 31 on a threaded portion 25 of the valve plug 18.

My automatic shut-off unit includes a body 32 which is adapted to be mounted in depending relation to the valve body 10 by means of a threaded portion 44 thereof screwed into the valve body. Within the body 32 a tubular or annulus-shaped permanent magnet 52 is loosely mounted for vertical sliding movement. The magnet 52 is magnetized at opposite sides of the diameter of the annulus and also its north and south poles are at only one axial end thereof. The magnet is installed with this pole end up.

An armature 50 of disc-like character is adapted to coact with the magnet 52 and has a sleeve portion 46 slidable in the upper portion 44 of the body 32. The sleeve portion 46 has a stop ring 48 surrounding it and located in a groove thereof.

A disc 58 supports the magnet 52 and is threaded on a stem 60 having a head 62. The stem 60 in turn is supported by a normally bowed diaphragm 36 within a diaphragm housing 34, which housing has a connector fitting 38 thereon with which a capillary tube 40 connects. The capillary tube terminates in a temperature sensing bulb 42 which may be located adjacent a pilot light or the like and is thus normally heated to retain the diaphragm 36 in the bowed up position of Figure 1.

A spring 56 is interposed between the disc 58 and the armature 50 and a somewhat stronger spring 54 is interposed between the magnet 52 and a shoulder adjacent the top of the housing 32. The spring 54 operates in opposition to the pressure that bows the diaphragm 36 upwardly and is effective to lower the magnet 52 to the position of Figure 2 when this pressure recedes.

The power unit 34—36 is held in the body 32 by a retainer ring 35. The assemblage 34—36—38—40—42 forms a temperature responsive sensing and power unit wherein a decrease in temperature will permit the diaphragm 36 to move from the bowed up position of Figure 1 to the normal position of Figure 2. Obviously, the power unit 34—36 may be subject to pressure as distinguished from temperature or any other type of power unit may be provided for manually or automatically moving the stem 60 or permitting its movement downwardly for tripping the regulator valve as will hereinafter appear.

Resetting means is provided for resetting the parts from the Figure 2 position to the Figure 1 position and consists of a stem 76 to engage a screw 82 in the tubular nut 31, the stem being connected with a reset button 78 normally held in the raised position shown in Figure 1 by a spring 80 in the closure plug 74.

Indicating means is provided for my automatic shut-off unit to indicate when it has tripped the valve. This consists of a groove 70 around the body 32 and a ring 72 of ferrous material therein, the groove being slightly deeper

Practical operation

In the operation of my automatic shut-off for regulator valves and the like, assuming the parts to be in the position shown in Figure 1, the automatic shut-off unit is inoperative by reason of the magnet 52 holding the armature 50 in the lowered position. The valve plug 18 is accordingly free to modulate in response to outlet pressure against the diaphragm 20 balanced by the spring 26 at whatever adjustment setting it happens to be.

Upon loss of temperature as by the pilot light going out and the bulb 42 thereby cooling, the spring 54 will move the magnet 52 downwardly and through the disc 58 move the head 62 of the stem 60 also downwardly for returning the diaphragm 36 from the operative position of Figure 1 to the normal position of Figure 2. As soon as the magnet 52 leaves the armature 50 (which is held against downward movement by the stop ring 48) and is spaced a sufficient distance therefrom so that the magnetic pull is no longer greater than the force of the spring 56 tending to elevate the armature 50, the spring will expand and move the assemblage 46—50 and thereby the valve 18 upwardly to seated position against the seat 16 as shown in Figure 2. The spring 56 will retain the valve seated and will be aided by the incoming pressure from the inlet 12 until such time as reset is effected.

To effect reset, the reset button 78 is depressed whereupon the stem 76 will engage the screw 82 and through it will open the valve 18 relative to its seat 16 and at the same time move the shut-off element 46 downwardly until the magnetic pull of the magnet 52 on the armature 50 snaps the armature to the reset position shown in Figure 1, it being assumed of course that the pilot light has been relit and the magnet 52 is reset in its normal operating position shown in Figure 1 due to the upward bowing of the diaphragm 36.

When the valve is tripped as in Figure 2, the magnetic flux pattern of the magnet 52 changes as the magnet is no longer shorted by the armature 50. Since the magnet 52 is transversely rather than being axially magnetized, the poles of the magnet at its upper surface will so attract the ring 72 as to lift it and tend to center it relative to the upper face of the magnet. It will, however, float at a slightly lower-than-centered position as shown in Figure 2 as the force of gravity must be overcome by the magnetic lifting force. In this position it is observable beyond the top of the annular groove 70 and serves as an indicator. Upon reset of the valve the armature shorts the magnet thus sharply reducing stray flux density and as a result the ring drops by gravity to the position shown in Figure 1.

The purpose of threading the stem 60 in the disc 58 is to provide for adjustment of the position of the lower end of the stem in relation to the diaphragm 36. The desired trip point may thus be preset before the power shut-off unit is assembled in relation to the valve body 10.

The foregoing described invention, it will be obvious, serves as a low limit shut-off. On a decrease in heat on the thermal responsive bulb 42, the diaphragm 36 is bowed back to the initial position of Figure 2 by the spring 54, thus directly creating a gap between the armature 50 and the magnet 52. When this gap is great enough the force of the spring 56 overcomes the holding force of the magnet and the mechanism triggers off to strike the bottom of the regulator valve 18, driving it against the seat 16 and shutting the valve off. The reset mechanism is a manual push-pin arrangement which brings the armature disc back into contact with the magnet.

The thermal responsive element 42 may be placed adjacent a pilot light or any other source of heat in relation to which it is desirable to have the shut-off unit become operative upon failure thereof.

Some changes may be made in the construction and arrangement of the parts of my automatic shut-off without departing from the real spirit and purpose of my invention, and it is my intention to cover by my claims any modified forms of structure or use of mechanical improvements which may reasonably be included within their scope.

I claim as my invention:

1. In an automatic shut-off for regulator valves and the like, a shut-off unit comprising a body, a shut-off element projectable from said body, a spring within said body tending to cause such projection, means holding said element against movement into said body, means comprising magnet and armature members to normally retain said shut-off element against the bias of said spring, one of said members movable relative to the body and the other carried by said shut-off element, said magnet and armature members when in engagement overcoming the bias of said spring, a second spring in said body biasing said one of the members to a predetermined position, and automatic means to overcome the force of said second spring on said one of the members, said automatic means when it fails to function, permitting said second spring to overcome the pull of said magnet member on said armature member to thereby permit the first spring to function and cause such projection of said shut-off element.

2. In an automatic shut-off for valves, a shut-off unit comprising a body, a shut-off element projectable from said body, a spring within said body tending to cause such projection, means holding said element against movement into said body, means comprising magnet and armature members to normally retain said shut-off element against the bias of said spring, one of said members movable relative to the body and the other carried by said shut-off element, said magnet and armature members when in engagement overcoming the bias of said spring, a second spring in said body biasing said one of the members to a predetermined position, automatic means to overcome the force of said second spring on said one of said members, said automatic means when it fails to function, permitting said second spring to overcome the pull of said magnet member on said armature member to thereby permit the first spring to function and cause such projection of said shut-off element, and manual means to reset said shut-off element by reengagement of said magnet and armature members.

3. In an automatic shut-off for valves and the like, a shut-off unit comprising a body, a shut-off element projectable from said body, a spring within said body tending to cause such projection, stop means limiting movement of said element into said body, means to normally retain said shut-off element against the bias of said spring comprising a magnet movable relative to the body and an armature carried by said shut-off element, said magnet and armature when in engagement overcoming the bias of said spring, a second spring in said body biasing said magnet to a predetermined position, automatic means to overcome the action of said second spring on said magnet, said automatic means when it fails to function permitting said second spring to cause said magnet to overcome the pull of said magnet on said armature to thereby permit said first spring to function, and condition responsive means to operate said automatic means.

4. In a device of the class described, a shut-off unit for a valve comprising a body, a shut-off element projectable from said body, means within said body biasing said shut-off element to valve-closing position, stop means limiting movement of said element into said body, means to normally retain said shut-off element against the bias of said biasing means comprising a magnet slidable in said body, said shut-off element including an armature for magnetic engagement therewith, a power element, condition responsive means normally operating said power element and thereby causing said magnet to move to a position of contact with said armature, means biasing said magnet in the opposite direction so that, when said power element fails, the magnet will be moved away from the armature and the first bias will then move the shut-off element to the shut-off position, and means for resetting said shut-off unit for a subsequent shut-off operation.

5. In a device of the class described, a shut-off unit for a valve comprising a body, a shut-off element projectable from said body, means within said body biasing said shut-off element to valve-closing position, stop means limiting movement of said element into said body, means to normally retain said shut-off element against the bias of said biasing means comprising a magnet movable in said body, said shut-off element including an armature for magnetic engagement therewith, a power element, condition responsive means normally operating said power element and thereby causing said magnet to move to a position of contact with said armature, and means biasing said magnet in the opposite direction so that, when said power element recedes, said magnet will be moved away from said armature.

6. A shut-off unit comprising a body, a magnet therein, a shut-off means projectable from said body into a shut-off position, a spring to effect such projection, stop means limiting the movement of said shut-off means into said body, an armature carried by said shut-off means and engageable with said magnet against the force of said spring, a second spring to move said magnet, and power means to hold said magnet against the force of said second spring whereby upon failure of said power means said second spring will space the magnet from the armature and thereby permit said first spring to project said shut-off means from said body to shut-off position.

7. A shut-off unit comprising a body, a magnet therein, a shut-off means projectable from said body into a shut-off position, a spring to effect such projection, stop means limiting the movement of said shut-off means into said body, an armature carried by said shut-off means and engageable with said magnet against the force of said spring, a second spring to move said magnet, power means to hold said magnet against the force of said second spring whereby upon failure of said power means said second spring will space the magnet from the armature and thereby permit said first spring to project the shut-off means from said body to shut-off position, and means for indicating the position of said shut-off means comprising an annular upwardly opening groove in said body surrounding said magnet and a ferrous ring loosely mounted therein.

8. In a device of the class described, a shut-off unit for a valve comprising a body, a shut-off element projectable from said body into valve-closing position, means within said body biasing said shut-off element to valve-closing position, stop means establishing the limit of movement of said element into said body, automatic means to normally retain said shut-off element against the bias of said biasing means comprising a magnet and an armature, condition responsive means to operate said automatic means, and means to indicate when said shut-off element has operated comprising said body having an upwardly opening groove surrounding said magnet, a ferrous ring on said groove, said groove being positioned to substantially wholly receive said ring when the armature is against the magnet and to permit the change in magnetic flux when the armature is spaced from the magnet to raise the ring against the action of gravity and retain it in an elevated position with the upper edge thereof appearing above said groove.

References Cited in the file of this patent

UNITED STATES PATENTS

| | | |
|---|---|---|
| 626,594 | Chapman | June 6, 1899 |
| 2,412,235 | Van Denberg | Dec. 10, 1946 |
| 2,533,491 | McMahon | Dec. 12, 1950 |
| 2,579,723 | Best | Dec. 25, 1951 |
| 2,616,451 | Hunter | Nov. 4, 1952 |